United States Patent [19]

Mortimer

[11] 4,186,413
[45] Jan. 29, 1980

[54] APPARATUS FOR RECEIVING ENCODED MESSAGES ON THE SCREEN OF A TELEVISION RECEIVER AND FOR REDISPLAY THEREOF ON THE SAME RECEIVER SCREEN IN A READABLE FORMAT

[75] Inventor: Thomas J. Mortimer, Amherst, N.H.

[73] Assignee: Sanders Associates, Inc., Nashua, N.H.

[21] Appl. No.: 851,093

[22] Filed: Nov. 14, 1977

[51] Int. Cl.² .............................................. H04N 7/00
[52] U.S. Cl. .................................................. 358/146
[58] Field of Search ...................... 358/142, 146, 147

[56] References Cited

U.S. PATENT DOCUMENTS

| | | | |
|---|---|---|---|
| 3,848,082 | 11/1974 | Summers | 358/146 |
| 3,891,792 | 6/1975 | Kimura | 358/142 |
| 4,052,719 | 10/1977 | Hutt et al. | 358/147 |
| 4,077,049 | 2/1978 | Baer | 358/93 |
| 4,117,511 | 9/1978 | Baer et al. | 358/142 |

OTHER PUBLICATIONS

American Microsystems, Inc., 51757, Universal Asynchronous Receiver/Transmitter, pp. 7-3 to 7-8, Copyright 1975.
Summers, "The Data Dot System", *Signal*, Jan. 1975, pp. 35-42.
King, "A Novel Television Add-On Data Communications System", *Journal of the SMPTE*, Jan. 1974, pp. 10-13.

*Primary Examiner*—John C. Martin
*Attorney, Agent, or Firm*—Louis Etlinger; Richard I. Seligman

[57] ABSTRACT

A television message system is disclosed wherein encoded data displayed on a small area of a television screen is received by a photosensitive pickup which responds to the encoded data, and including a message processor for storing viewer selected data and processing such data for redisplay on the television screen as readable alpha-numerics.

11 Claims, 6 Drawing Figures

APPARATUS FOR RECEIVING ENCODED MESSAGES ON THE SCREEN OF A TELEVISION RECEIVER AND FOR REDISPLAY THEREOF ON THE SAME RECEIVER SCREEN IN A READABLE FORMAT

BACKGROUND OF THE INVENTION

Presently television broadcasters occasionally transmit to their viewers auxiliary information in the form of messages which are displayed on the viewers' television receivers as alpha-numeric data which usually horizontally scrolls across the television receiver screen, generally near the bottom thereof. These auxiliary messages are only transmitted infrequently such as to notify viewers of fast-breaking news items of general interest or of programming changes, such as a delay in the start of an upcoming program. The present use of this method to convey information to viewers is thus minimal.

This, of course, is in part due to the fact that viewers would generally find an excessive amount of such auxiliary messages distasteful, being of interest only to some and to many very distracting from the programs they are watching.

In order to avoid disturbing viewers not interested in the auxiliary messages, they may be transmitted in a coded fashion as, for example, by intensity modulating a small area of the television screen with a viewer employing a decoder to decode the intensity modulated message. The transmitted auxiliary message appears on the television screen as a small bright spot. Such a system is described in U.S. Pat. No. 3,993,861 for a "Digital Video Modulation and Demodulation System" assigned to the assignee of the present application and incorporated herein by reference. This system, while presenting messages with minimum distraction to the viewer, is limited in that the viewer does not have any control over the specifics of the messages which he receives and processes. For example, if all news, sports, weather and stock market information is so broadcast, a user is burdened by the requirement of receiving all such information when, in fact, he may only be interested in receiving weather reports or stock market prices. Furthermore, such a system does not provide for display of such messages on the television receiver the user is watching but rather requires some additional equipment to utilize the coded messages.

SUMMARY OF THE INVENTION

Accordingly, it is an object of this invention to provide a television message system which permits a viewer to decode encoded messages supplied by a television station and display the messages on his television receiver.

It is another object of this invention to provide such a system wherein the viewer can select particular messages for display.

Briefly, a broadcast television station, closed circuit television facility, or cable television service serially transmits numerous messages covering a broad range of topics. The transmission method is preferably by intensity modulating a defined fixed area of the video picture with the encoded message texts, using ASC11 or other code. Each message is assigned to a category; for example, sports, weather, news priority 1, news priority 2, news local, news regional, stock market reports, etc. Each category is preferably assigned and prefaced by a binary code word—sports (0001), weather (0010), news priority 1 (0011), etc.

A viewer wishing to receive some (or possibly all) of these messages attaches a photosensitive pickup over the intensity modulated spot on his television screen. The photosensitive pickup is coupled to a message processor.

The message processor contains a keyboard or similar input device which allows the viewer to select which message categories he wishes to receive. For example, he might wish only to see messages on weather and local news. Pressing the keys for local news and weather, programs the message processor to store and display only messages which are prefaced with code words 0010 (weather) and 0101 (local news) and to ignore all other messages.

The received encoded messages are stored by the message processor then recoded in a dot matrix format compatible with a raster scan display and sequentially read from memory so as to form a horizontally scrolling ("Times Square" type) message display across the bottom of the television screen. The dot matrix formulated message is applied to the antenna terminals of the television receiver for display thereby.

BRIEF DESCRIPTION OF THE DRAWINGS

The above-mentioned and other features and objects of the invention will become more apparent by reference to the following description taken in conjunction with the accompanying drawings, in which.

DESCRIPTION OF PREFERRED EMBODIMENT

Figure 1:
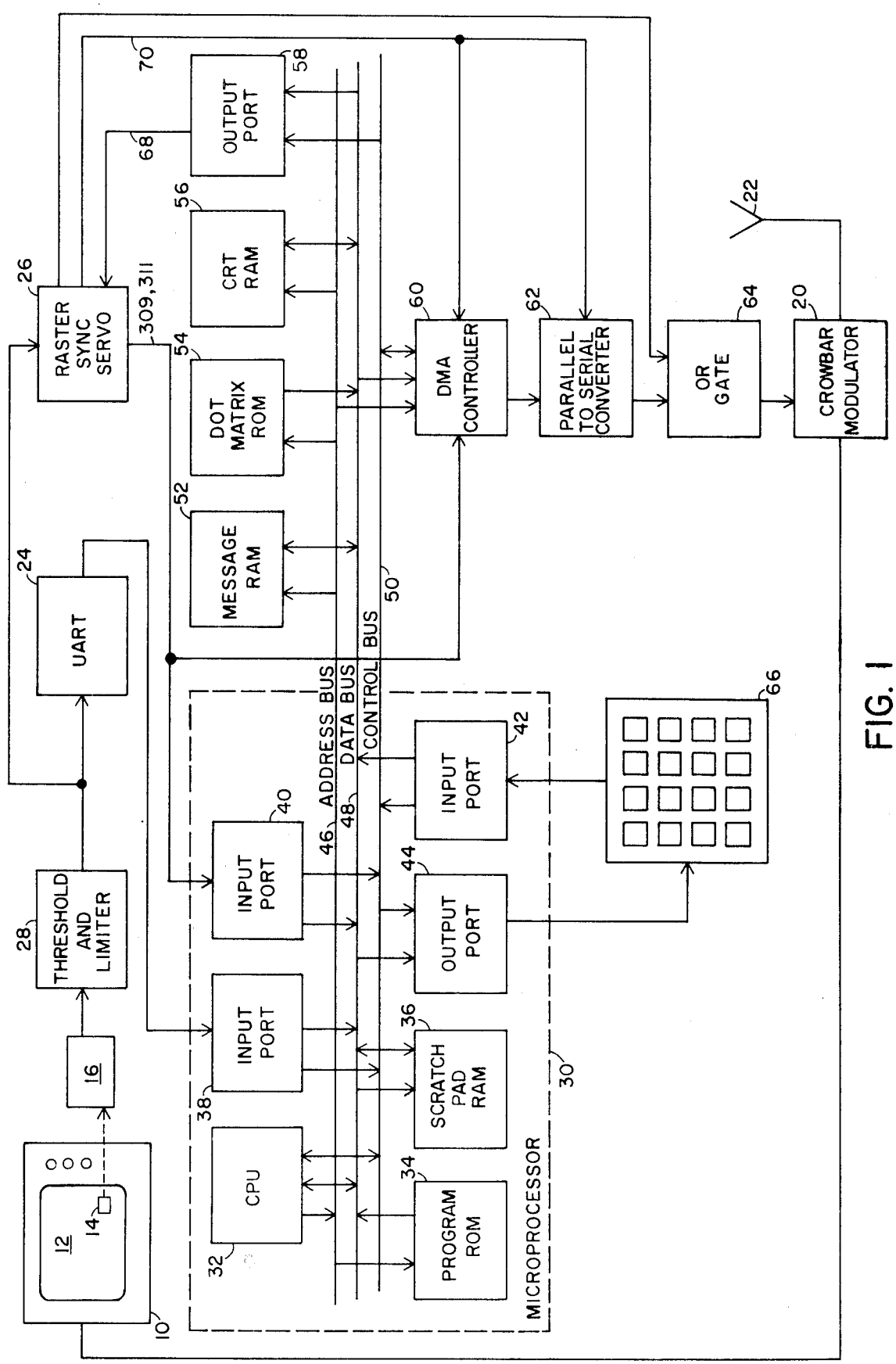
FIG. 1 is a system block diagram of one embodiment of the invention.

Referring now to FIG. 1 of the drawings, there is illustrated thereby a preferred embodiment of the invention, comprising a television receiver 10 on which encoded messages are to be displayed for use by a viewer. Encoded messages received from a cooperative television station such as a broadcast station, closed circuit, or a CATA installation are displayed on the screen 12 of television receiver 10, or monitor for closed circuit applications, at a selected area 14 thereof. The encoded messages displayed at area 14 are preferably encoded in the form of binary coded, digital brightness modulation, using ASC11 or other code, in the manner set forth in the aforementioned U.S. Pat. No. 3,993,861.

The encoded messages on the television screen area 14 are received by a photosensitive pickup 16 which is coupled to a message processor for decoding the messages and converting them into a format which allows their display on the screen 12 of television receiver 10 in readable format. The decoded, television formatted messages are outputted from the message processor and applied to a modulator 20 for displaying the messages on a portion of the television screen in place of the information normally displayed thereon which is received from a broadcast station via an antenna 22 or from a CATV service or closed circuit facility via a cable (not shown).

The output of the photosensitive pickup 16 is applied to a message processor including a universal asynchronous receiver transmitter circuit (UART) 24 and a raster sync servo 26 which are coupled to pickup 16 via a threshold and limiter circuit 28. Th UART circuit is conventional and is available as an integrated circuit from several manufacturers. The raster sync servo 26 is employed in extract horizontal and vertical synchronization signals from the television receiver while it is receiving a broadcast program, and one typical embodiment thereof will be described hereinafter in conjunction with FIG. 3 of the drawings.

The outputs of the UART circuit 24 and raster sync servo 26 are applied to a microprocessor 30. Microprocessor 30 is conventional and includes a central processing unit (CPU) 32, a program read-only memory (ROM) 34, a scratch pad random-access memory (RAM) 36, input and output ports 38, 40, 42, 44 and address, data, and control buses 46, 48, and 50, respectively.

The apparatus for processing the encoded data received on the television receiver screen also includes a message RAM 52, a dot matrix character ROM 54, a CRT RAM 56, an output port 58, a DMA controller 60, a parallel to serial converter 62, an OR gate 64, and an entry device, in this embodiment keyboard 66.

One of the features of the present invention is that not all of the encoded messages appearing at area 14 need be decoded and transformed into a format which allows displaying the actual message on the television screen. Instead the viewer is provided with the capability to select certain messages for display. For example, if the viewer is only interested in messages regarding sports, for example, ballgame scores, then the viewer through keyboard 66 makes this known to the microprocessor. One manner of accomplishing this is to encode each distinct type of message by a prefix code word, such as the code word 0010 indicating weather messages, the code word 0001 indicating sports messages, etc.

Accordingly, the viewer can select the class of messages he desires to see by entering the proper code word by using keyboard 66.

Those messages which the viewer selects, those having the proper code word prefix, are applied to a message RAM 52 wherein the messages are stored.

The message stored in RAM 52 is encoded into a standard dot matrix format suitable for display on the screen of receiver 10 by employing a dot matrix character ROM 54 and storing the resultant dot coded message image in CRT RAM 56 for dumping to the television receiver for display thereby.

In conventional fashion program ROM 34 of microprocessor 30 contains the program to carry out the process. The scratch pad RAM 36 is used by the CPU 32 to keep its stack pointers, dynamic program variables, etc., as is conventional.

The DMA controller 60 in conventional fashion facilitates the high data rate transfer from CRT RAM 56 to the message display. During message display, as each byte is fed out from the DMA controller it is fed to the parallel to serial converter 62 to provide a serial bit stream which is applied via OR gate 64 to the crowbar modulator 20.

One embodiment of the system operation prefers that the auxiliary data transmission be kept to a minimum duration in order that the potential objectionable white modulated spot on screen 12 will be present for as short an interval as practical. Thus, viewers who do not own message processing equipment will not have to tolerate an intensity modulated spot on their screen any longer than is necessary. Accordingly, it is desirable to preface each auxiliary information data transmission with several code words to indicate that this is indeed a transmission beginning. In this way these coded words may be used to differentiate the intensity modulation of an actual transmission from a normal video data broadcast display.

In the embodiment described herein the data encoding means is synchronous serial data as is standard in the art with conventional start and stop bits for each character. Each message type will be prefaced with one or more code words which define the category of the information to follow, that is, either sports, weather, local news, national news, etc. The system user must key into his unit via keyboard 66 those code words to which he desires his unit to be responsive. These code words are loaded into the microprocessor memory via the keyboard as is conventional in the art.

In summary, the brightness or intensity modulated spot at area 14 of the screen is detected by the photosensitive pickup 16 and applied to the threshold and limiter circuit 28. The output of this circuit is applied to the UART circuit 24, the output from which is a character serial word stream.

At the beginning of an auxiliary data transmission the processor will first examine the output from the UART circuit for beginning of message identification codes. When these codes are detected, the processor begins a matching process to examine the subject code words for identity with code words which have been loaded from keyboard 66. When a subject code word match is detected, subsequential data words from the auxiliary message information are loaded into a message RAM 52. When message transmission ceases, one or more end-of-message characters will be transmitted from the broadcast station. The processor detects these end-of-transmission characters and first enables raster sync servo circuit 26 and secondly begins formatting the stored messages for display on the user's television.

The messages are formatted for display by sequentially taking the individual character codes and converting them to the dot matrix format which will be used for the display. More specifically, each character code is used as an address code for dot ROM 54. Under processor control these dot codes coming from the dot ROM 54 are stored in CRT RAM 56. The CRT RAM essentially contains the message image in coded dot format of the actual display to be presented on the television receiver. The contents of the CRT RAM 56 are dumped to the display under control of the DMA controller 60 and the crowbar modulator 20. The crowbar modulator presents this information to the television receiver to be displayed instead of the broadcast information.

Figure 2:
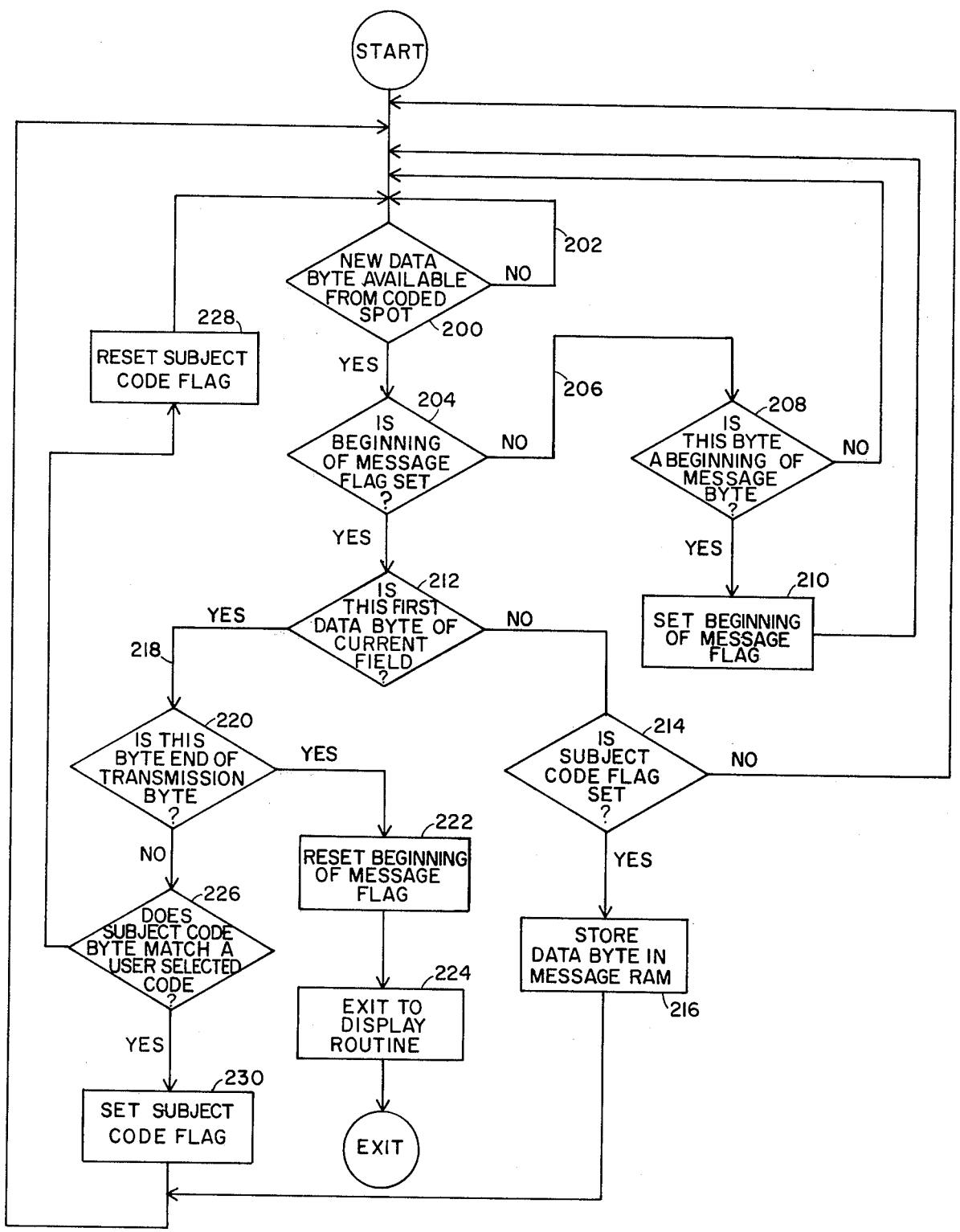
FIG. 2 is a flow chart of a controlling program for the system of FIG. 1.

Referring now to FIG. 2, there is illustrated thereby the flow chart of a typical controlling program for the system of FIG. 1. This program is stored in the program ROM 34 of microprocessor 40. The present process is employed in an embodiment of the invention wherein the message transmitted at the area 14 of screen 12 takes the form of a first byte which indicates the beginning of a message, a second byte which is the subject code for a particular subject portion of the message, a third byte which is the first character of the first particular subject message, a number of other bytes which are the rest of the characters for that first particular subject message, additional subject codes and characters for other subject messages, and finally a byte indicating the end of message transmission. Of course, this characterization of the messages is exemplary only and various other codings may be employed with the details of the process shown in FIG. 2 modified accordingly.

In a typical reception, decoding, formatting, and displaying process useable by the system of FIG. 1, step 200 of the controlling program requires that the microprocessor ascertain whether a new data byte is available from the coded area 14 of the CRT screen 12. If no new data byte is available, then via line 202 the process begins anew, that is, the microprocessor continues to look for a new data byte. If a new data byte is available, then step 204 is executed and the microprocessor makes a determination whether or not the beginning of message flag has been set by the microprocessor. If the beginning of message flag has not been set, then the process via line 206 goes to step 208 to determine if the byte is a beginning of message byte. If "no," then the processor returns to step 200 of the process. If the answer is "yes," then step 210 of the process occasions the beginning of the message flag to be set and returns to step 202.

If at step 204 it is determined that the beginning of message flag has been set, the microprocessor goes to step 212 to determine whether the word is the first data byte of the current field or the first data byte following the beginning of message byte. If such determination is in the negative, then the processor determines via step 214 whether the subject code flag has been set, that is, does this byte pertain to a keyboard selected message. If "no," the process returns to step 202. If affirmative, the processor, via step 216 stores the data byte in the message RAM 52, and then returns again to step 202 to look for the next byte. In this embodiment the first byte in each field is a subject code byte.

If, during step 212 it is determined that the byte is the first data byte of the current field or the first data byte following the beginning of the message byte, then via line 218 the processor goes to step 220 to determine if this byte is the end of transmission byte. If "yes," then via step 222 the processor resets the beginning of the message flag indicating that transmission is over, and the processor goes on to the display routine via step 224 to display the alpha-numeric message on the screen of the television receiver. If it is determined in step 220 that this particular byte is not the end of transmission byte, then via step 226 the microprocessor determines whether the subject code byte matches a user selected code as selected by a user via his keyboard 66. If not, the subject code flag is reset at step 228 and the process returns to the beginning. On the other hand, if it is determined that the subject code byte does match a user selected code, then the processor at step 230 sets the subject code flag and returns to the beginning of the process to examine the next byte available.

Figure 3:
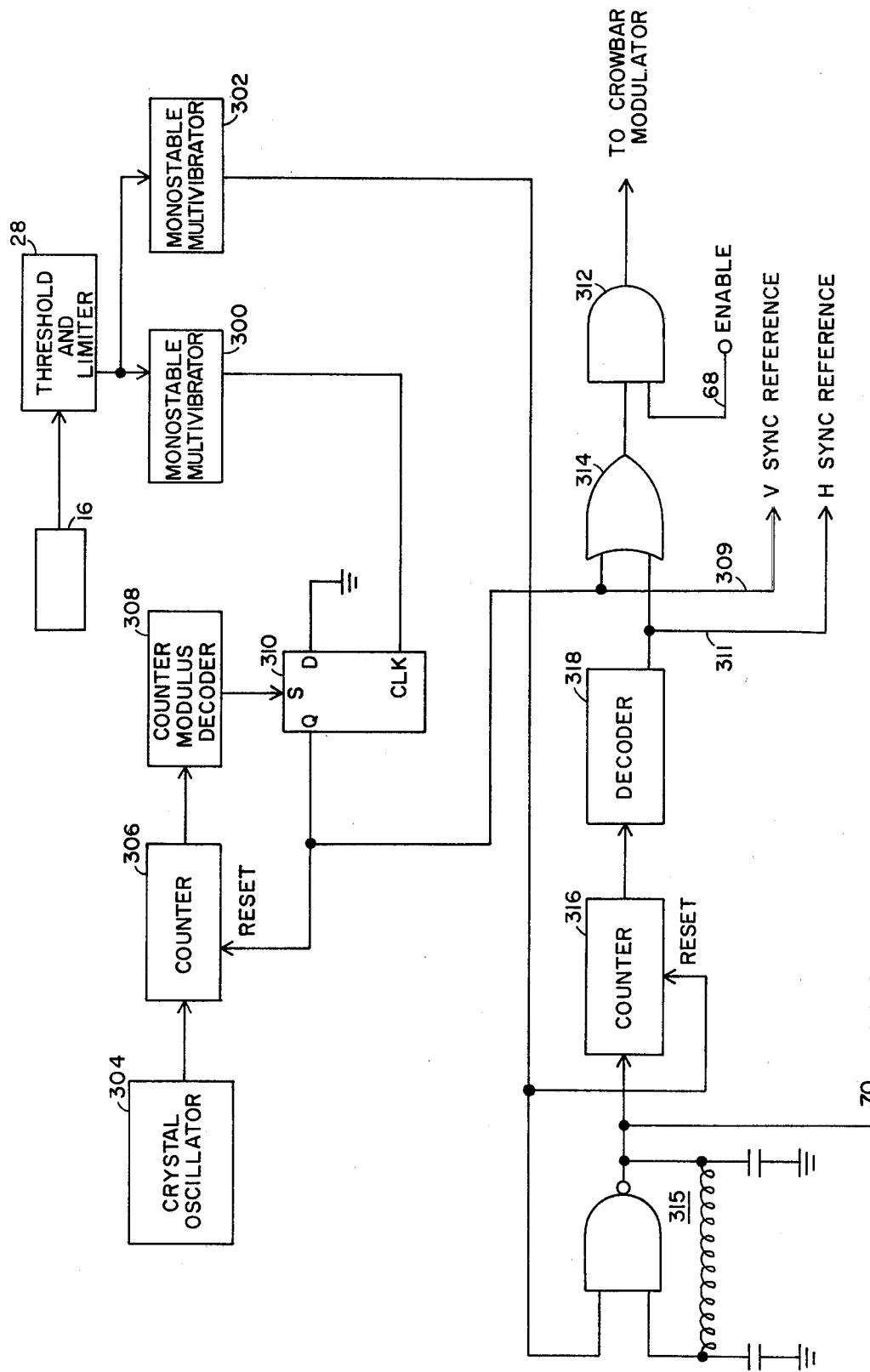
FIG. 3 is a block diagram of the raster sync servo employed in the system of FIG. 1.
Figure 4:
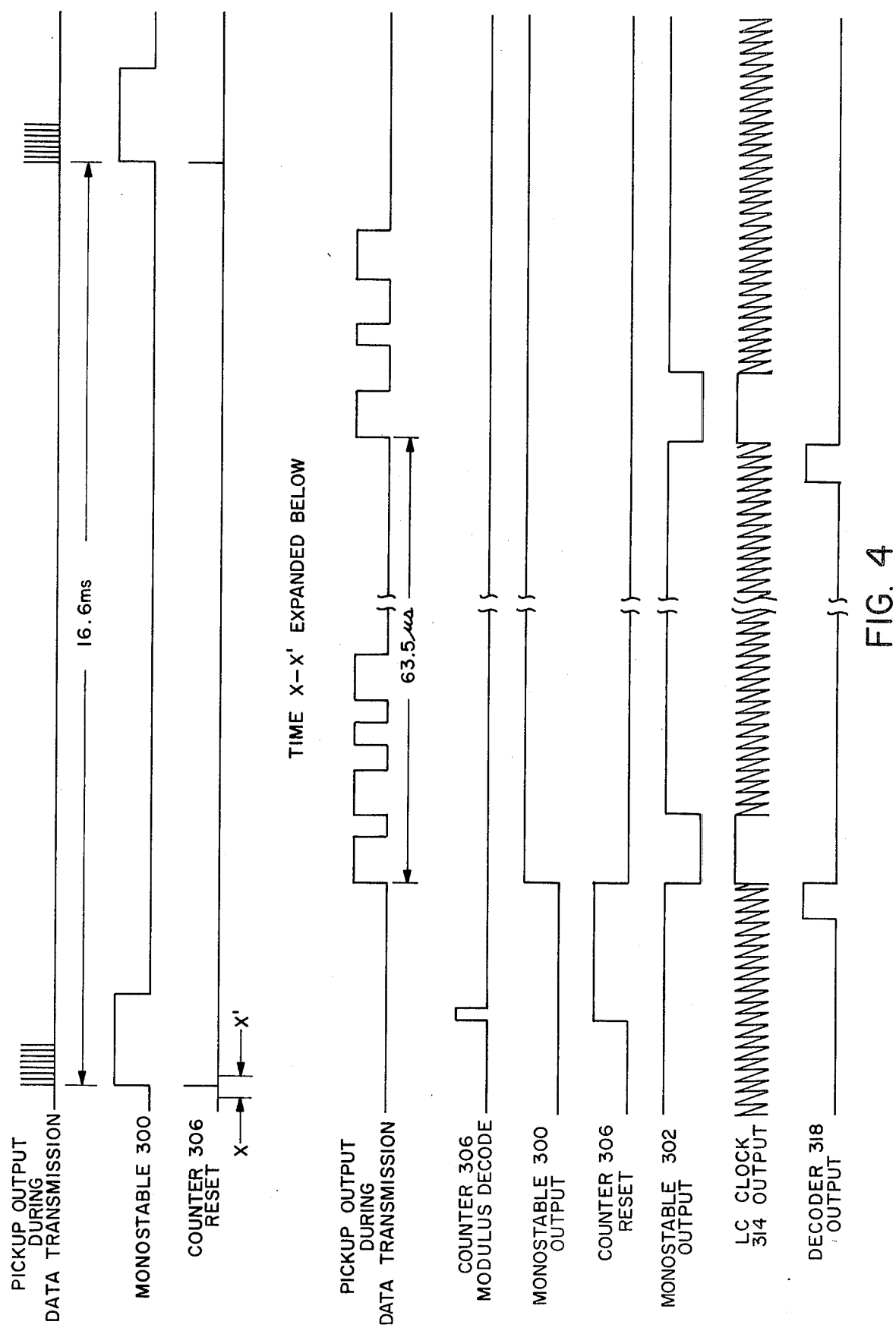
FIG. 4 is a series of wave forms illustrating operation of the raster sync servo of FIG. 3.

One embodiment of the raster sync servo 26 is shown in detail in FIG. 3 of the drawings. The wave forms of FIG. 4 are employed in understanding the operation of this circuit. In this embodiment initial synchronization with a television program or lock with a television program sync is achieved during the transmission of the coded auxiliary information at area 14 of the television receiver screen. The output of photosensitive pickup 16 and threshold and limited circuit 28 is a binary logic signal. This binary logic signal is applied to a pair of monostable multivibrators 300 and 302.

A crystal oscillator 304, a counter 306, and a counter modulus decoder 308 are configured so as to time out an interval just a few microseconds short of the exact vertical retrace interval. The output of oscillator 304 is applied to counter 306 and the output therefrom to counter modulus decoder 308. The output of counter modulus decoder 308 is applied to the set input of a D-type flip-flop 310. The Q output of flip-flop 310 is fed to the reset input of counter 306. Thus, when the vertical retrace interval has been timed out by the circuits 304, 306, and 308, the D-type flip-flop 310 is set.

When the first raster line of the signal is detected by photosensitive pickup 16, monostable multivibrators 300 and 302 are triggered. The output of monostable multivibrator 300 is applied to the clock input of flip-flop 310 and clocks the flip-flop Q output to a zero state. The function of monostable multivibrator 300 is, thus, to provide a single transition per vertical scan interval even though up to eight or even more scan lines may be detected by the photosensitive pickup in the course of one field of auxiliary information data transmission.

In summary, the Q output of the flip-flop 310 is set to a logic 1 level a few microseconds before photosensitive pickup 16 detects the presence of the auxiliary information signal, and the same Q output is reset or clocked to logic 0 by the output of monostable multivibrator 300. Thus the Q output of the flip-flop 310 is a pulse train whose frequency and phase are identical with the vertical raster scan rate of the television receiver and provides a vertical sync reference signal 309 which is applied to microprocessor 30 and DMA controller 60.

Cessation of the digital data transmission is detected by microprocessor 30, and an enable signal 68 is applied by the processor to the raster scan servo. The enable signal is applied to an AND gate 312 at one input thereto. This enable signal permits the Q output signal of flip-flop 310 to be transmitted to the crowbar modulator 20 via an OR gate 314 and AND gate 312. The crowbar modulator, responsive to this signal, thus, generates a white line on the television raster display several microseconds before the line comes into view of the photosensitive pickup 16. When the photosensitive pickup detects the presence of this white modulation line, it triggers monostable multivibrator 300 and resets the Q output of the flip-flop 310 and the white line is terminated.

Monostable multivibrator 302 is also triggered in response to the photosensitive pickup detecting the modulated white line. The output of monostable multivibrator 302 is a pulse of short duration--only several miscroseconds. The active low output of monostable multivibrator 302 is applied to nominally free-running LC oscillator 315 in order to inhibit same. One embodiment for this LC oscillator 315 is an RCA CD 40011 integrated circuit. The output of the LC oscillator 315 is applied to a counter 316. The output of monostable multivibrator 302 is also fed to the reset input to counter 316. The output of counter 316 is applied to a decoder 318. Counter 316 and decoder 318 are configured so as to time out an interval just a microsecond or so short of the horizontal retrace interval. When this interval is timed out, an output is generated from the decoder 318 which is subsequently fed to the crowbar modulator 20 via OR gate 314 and AND gate 312. Thus, signal 311 is the horizontal sync reference signal, and it is also applied to microprocessor 30 and DMA controller 60.

The loop is then closed back around via the television receiver, the photosensitive pickup, and monostable multivibrator 302, which in turn inhibits the oscillator 315 and resets the counter 316 removing the decoded condition or state. In this way a phase lock is established on the horizontal retrace interval of the television receiver only during the screen area containing the horizontal scan lines in the field of view of the photosensitive pickup 16. It should be appreciated that the purpose of stopping and sequentially starting the oscillator 315 is to phase lock it exactly with the horizontal line rate. This phase lock LC clock is used to provide the time base for the DMA controller 60 via an output 70. It should be appreciated that the message overlay display is positioned on that portion of the CRT screen where the phase lock circuit is operative, that is the screen area colinear with th selected intensity modulated area 14.

Figure 5:
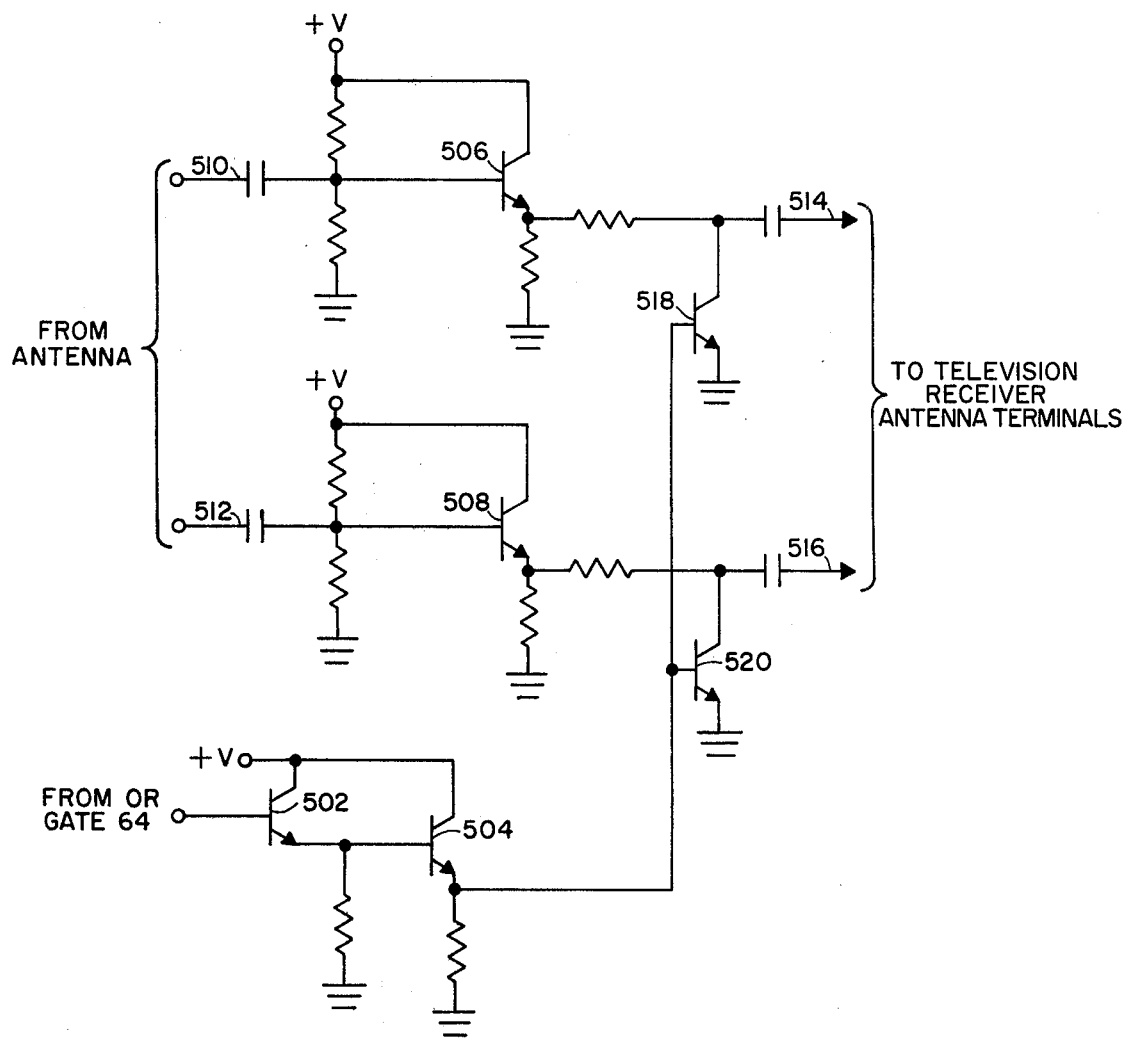
FIG. 5 is a schematic of the crowbar modulator employed in the system of FIG. 1.

One embodiment of crowbar modulator 20 which is conventional is shown in FIG. 5 of the drawings. The crowbar modulator comprises a pair of cascaded transistors 502 and 503 coupled to OR gate 64. A second pair of transistors 506 and 508 receive signals on lines 510 and 512 from the cable connected to the television antenna. The output of transistors 506 and 508 are coupled to the television antenna terminals of the receiver 10 via lines 514 and 516 when activated, and momentarily reduce the RF signal going from the antenna to the television receiver antenna terminals. This corresponds to carrier reduction, which is negative modulation and is equivalent to generating a video signal going from black to white and back to the black level.

Because the intensity modulated spot on area 14 of the television screen might be objectional to some viewers if presented there continually (particularly those not owning a message processor), the system can be configured to be used only during the few second station breaks which customarily occur every half hour. The aforementioned U.S. Pat. No. 3,993,861 shows how 8 eight-bit words may be transmitted every frame. This translates into a character data rate of 480 characters per second. Thus, during a ten-second station break approximately fifty one hundred-character messages could be broadcast.

Figure 6:
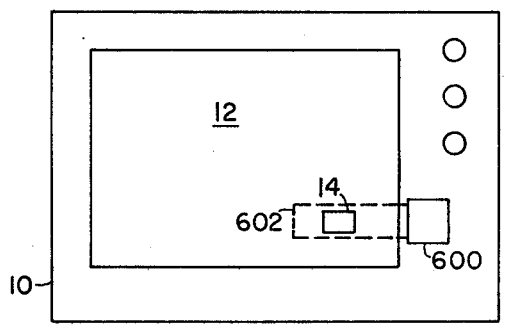
FIG. 6 is a diagram of a photosensitive pickup which may be employed in the system of FIG. 1

Because it may be inconvenient to place the photosensitive pickup adjacent area 14 during the ten-second station breaks, the invention also includes means for automatically accomplishing same. This is illustrated in FIG. 6 of the drawings.

In. FIG. 6, a photosensitive pickup 600 is shown in a position adjacent the screen 12. A solenoid or other activator is used to position the pickup in front of the coded area 14 when messages are incoming as indicated by dotted lines 602. The solenoid is configured so as to be responsive to a signal indicating that an encoded message is to be sent. One manner in which this is accomplished is by providing a microphone with pickup 600 to receive a predetermined audio tone transmitted by the television station when a message is about to be transmitted. The microphone's reception of this audio tone is used to activate the solenoid to move the photosensitive pickup over the spot 14.

Alternatively, a crystal controlled clock can be provided within the message processor and time used to activate the solenoid. In this case the messages would be transmitted at a precise time.

Instead of coding the messages by spot intensity modulation, the coded messages can be transmitted during the horizontal or vertical interval of the raster scan and electrically extracted in the manner described in U.S. Patent Application Ser. No. 796,796 filed May 13, 1977, now abandoned. Thus, it is to be understood that the embodiments shown are to be regarded as illustrative only, and that many variations and modifications may be made without departing from the principles of the invention herein disclosed and defined by the appended claims.

I claim:

1. Apparatus for receiving optically encoded data transmitted via a broadcast television receiver and superimposed on the normal pictorial information, and for displaying said data in readable format on the screen of said television receiver, comprising:

optically responsive means at the television receiver for receiving the optically encoded data from the screen thereof;

means coupled to said optically responsive means for generating horizontal and vertical synchronization signals in synchronization with the program received by the television receiver;

means coupled to said optically responsive means for processing the encoded data and converting it into a format which allows its display on the screen of the television receiver in a readable format;

means utilizing said generated synchronization signals for establishing synchronization between said processed data and the program received by the television receiver; and means for coupling said processed-synchronized data to the antenna terminals of the television receiver, so that said data is displayed on the screen of said television receiver in place of a portion of the pictorial information of the broadcast program without extracting the pictorial information and reprocessing it, whereby encoded data can be received and displayed in a readable format in conjunction with an ongoing broadcast program without connection to the inside of the television receiver.

2. Apparatus as defined in claim 1, wherein the optically encoded data is displayed on the television receiver as an intensity modulation of a small area thereof, said optically responsive means including a photosensitive device.

3. Apparatus as defined in claim 1, wherein the optically encoded data is coded to identify the subject category of the data, said processing means including means for permitting a viewer to select the category of data which is to be displayed on the screen of the television receiver in a readable format.

4. Apparatus as defined in claim 3, wherein said processing means includes a microprocessor.

5. Apparatus as defined in claim 4, wherein said selection permitting means includes a keyboard coupled to said microprocessor.

6. Apparatus as defined in claim 3, wherein said processing means includes means for storing the selected data.

7. Apparatus as defined in claim 1, wherein said processing means includes means for storing the received data.

8. Apparatus as defined in claim 7, wherein said processing means includes means for recoding the stored data in a dot matrix format.

9. Apparatus as defined in claim 8, further including means for coupling the dot matrix formatted data to the television receiver for display on the screen thereof as a horizontally scrolling message.

10. Apparatus as defined in claim 1, wherein said coupling means includes a crowbar modulator.

11. Apparatus for receiving optically encoded data transitted via a broadcast television receiver and superimposed on the normal pictorial information as an intensity modulation of a small area thereof, and for displaying said data in readable format on the screen of said television receiver, comprising:

optically responsive means at the television receiver for receiving the optically encoded data from the screen thereof, said optically responsive means including a photosensitive device;

means for automatically positioning said photosensitive device over said small area;

means coupled to said optically responsive means for generating synchronization signals in synchronization with the program received by the television receiver;

means coupled to said optically responsive means for processing the encoded data and converting it into a format which allows its display on the screen of the television receiver in a readable format;

means utilizing said generated synchronization signals for establishing synchronization between said processed data and the program received by the television receiver; and means for coupling said processed-synchronized data to the antenna terminals of the television receiver, whereby encoded data can be received and displayed in a readable format in conjunction with a broadcast program without connection to the inside of the television receiver.

* * * * *